P. B. Tyler

Cotton Press,

No 92, Reissued May 1, 1847.

N. PETERS, PHOTO-LITHOGRAPHER, WASHINGTON, D. C.

UNITED STATES PATENT OFFICE.

PHILOS B. TYLER, OF NEW ORLEANS, LOUISIANA.

IMPROVEMENT IN COTTON-PRESSES.

Specification forming part of Letters Patent No. 3,885, dated January 10, 1845; Reissue No. 92, dated May 1, 1847.

*To all whom it may concern:*

Be it known that I, PHILOS B. TYLER, formerly of the city and county of Philadelphia, in the State of Pennsylvania, but now of New Orleans, in the parish of Orleans and State of Louisiana, have invented new and useful Improvements in Cotton-Presses; and I do hereby declare that the following is a full, clear, and exact description of the principle or character which distinguishes them from all other things before known and of the manner of making, constructing, and using the same, reference being had to the accompanying drawings, making part of this specification, in which—

Figure 1:
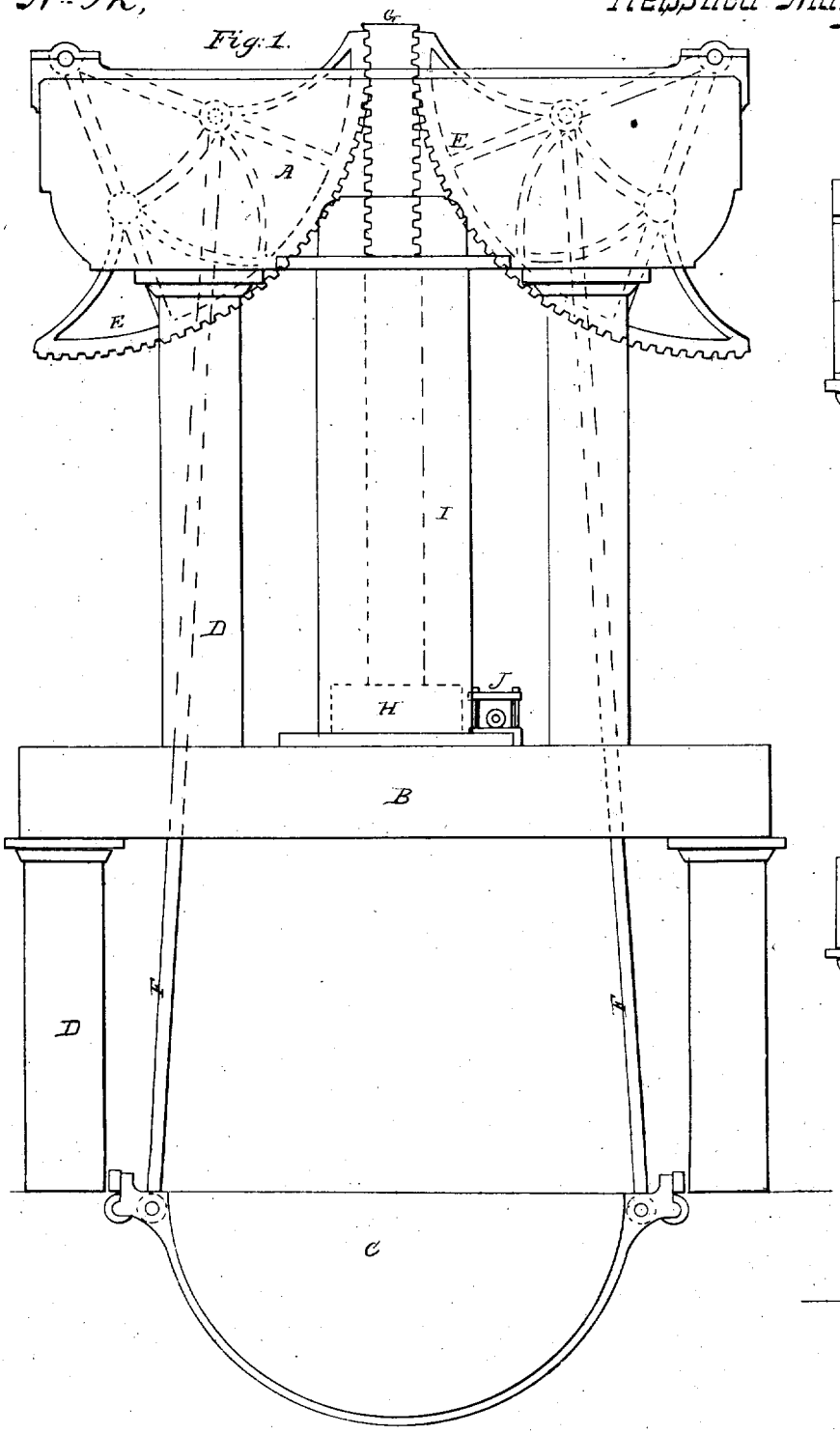
Figure 2:
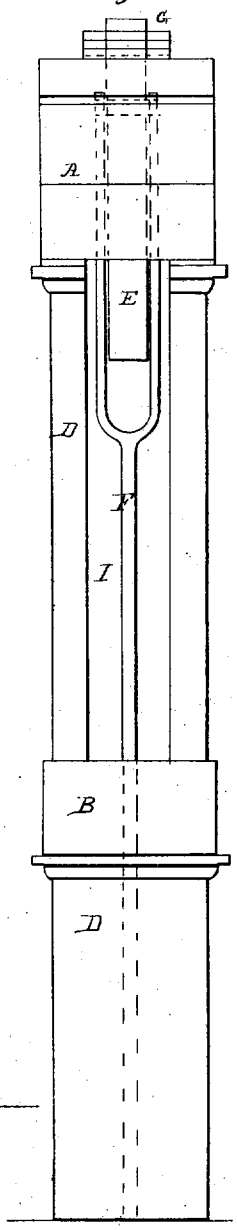

Figure 1 is a front and Fig. 2 a side elevation of my improved press.

The same letters indicate like parts in all the figures.

Various attempts have been made, particularly prior to the date of my invention, to apply the direct action of the piston of a steam-engine to compress cotton by attaching the piston-rod directly to the platen or follower of the press; but this is obviously a very defective mode of procedure, for the steam will at first meet with a very slight resistance, which gradually increases with the density of the cotton until the force becomes insufficient toward the end of the operation, unless the piston and cylinder be made of a very great diameter and the steam be used under very high pressure, to attain the force required at the end of the operation, in which there will be an over-cost of the construction and a considerable waste of steam.

The object of my invention is to avoid this waste in the construction and working of an engine for this purpose, and at the same time so to arrange the connection of the piston of the engine with the follower of the press that the leverage-force of the one shall increase in the ratio of the increased resistance, or nearly so, thus graduating the means to be employed to the end to be attained without waste.

The nature of my invention for this end consists in interposing between the platen or follower of the press and the piston or piston-rod of the engine two levers, placed on opposite sides of the piston-rod and operated by it, and connected with the platen or follower of the press by means of connecting-rods or their equivalents, at points between their fulcra and their connection with the piston-rod or piston, the connection between the levers and the piston-rod or piston being such as to act during the whole operation at the same distance from the centers of motion of the levers, while their connections with the platen or follower shall gradually diminish, and thus cause them to act on the principle of the bent or progressive lever to increase the effective force of the engine as the distance increases.

In the accompanying drawings, A represents the cap of the frame of a press, constructed on the principle of my invention; and B, the bed connected with the cap by means of columns D, another set of columns D being employed to support the bed B at the required elevation above the floor. On the top of the bed B is secured a steam-cylinder, I, open at top, and provided with appropriate induction and eduction valves at J in the usual manner, one set only being required, as the steam only acts against the under side of a piston, H, properly fitted to the cylinder. The rod G of this piston is provided with cogs on two faces opposite each other, which engage with corresponding cogs on two sector-racks, E E, that form the inner ends of two levers, the journals of which turn in appropriate boxes in the cap A of the frame. The form of these sector-levers is principally represented in Fig. 1 of the drawings by dotted lines. About midway between the fulcra or journals of these levers and their sector-racks. They are connected, by means of connecting-rods F F, with the platen or follower C of the press, which presses the bale of cotton up against the under side of the bed B on which the cylinder of the engine rests, so that it (the bed) is protected from serious strain as the downward pressure of the engine is counteracted by the upward pressure of the platen or follower.

From the above it will be seen that when steam is admitted from a boiler under the piston in the cylinder, its cogged piston-rod forces up the sector-lever, and acts on both of them on a line at right angles to a plane passing through the fulcra of the lever, whereas the connections of the platen or follower with the levers describe, segments of circles, the connecting-rods gradually approaching the centers of motion of the levers, thus gradually increasing the leverage or purchase of the piston, and therefore giving it a progressive increase of force; and hence any mode of forming the connection between the piston and the levers which will render its action on them in the line of its motion and at right angles with a plane passing through the fulcra, or nearly so, that the action of the piston on the levers may continue at the same distance from their centers of motion, will produce the same effect by substantially the same means, as there are known mechanical equivalents which will produce this effect—as, for instance, instead of the cogged sectors the piston-rod may be connected with each sector by means of chains attached to the ends of the sectors and the piston-rod; or instead of the sector the piston may be connected with the ends of the levers by means of two jointed links; in short, any of the mechanical equivalents known to mechanicians for effecting this end may be substituted for the cogged sectors.

What I claim, therefore, as my invention, and desired to secure by Letters Patent, is—

Combining the piston of a steam-engine with the follower or platen of a press by the interposition of the two progressive levers, substantially as herein described, whereby the direct and constant force of the steam-piston shall operate the follower or platen by a force increasing in the ratio of the increased resistance, or nearly so, as described.

PHILOS B. TYLER.

Witnesses:
JOHN BROOKS,
R. STEVENSON.